(12) United States Patent
Lee

(10) Patent No.: US 11,007,681 B2
(45) Date of Patent: May 18, 2021

(54) MICROWAVE APPLICATOR WITH PRESSURIZER FOR PLANAR MATERIAL HEATING

(71) Applicant: Toyota Motor Engineering & Manufacturing North America, Inc., Plano, TX (US)

(72) Inventor: Jae Seung Lee, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 452 days.

(21) Appl. No.: 16/140,345

(22) Filed: Sep. 24, 2018

(65) Prior Publication Data
US 2020/0094445 A1   Mar. 26, 2020

(51) Int. Cl.
*B29C 35/08* (2006.01)
*H05B 6/80* (2006.01)
(Continued)

(52) U.S. Cl.
CPC .......... *B29C 35/0805* (2013.01); *B29C 43/52* (2013.01); *H05B 6/6447* (2013.01);
(Continued)

(58) Field of Classification Search
CPC ...... B29C 35/0805; H05B 6/80; H05B 6/642; H05B 6/6402; H05B 6/78
See application file for complete search history.

(56) References Cited

U.S. PATENT DOCUMENTS

| 2,783,348 | A | * | 2/1957 | Warren | ............ | H05B 6/62 |
| | | | | | | 219/778 |
| 4,269,581 | A | | 5/1981 | Ury et al. | | |

(Continued)

FOREIGN PATENT DOCUMENTS

| CN | 2617559 | 5/2004 |
| DE | 102004049060 | 6/2005 |

(Continued)

OTHER PUBLICATIONS

Scientific and Technical Information Center (STIC), EIC Search Report for U.S. Appl. No. 16/140,345, filed Feb. 8, 2021 (Year: 2021).*

*Primary Examiner* — Robert J Utama
*Assistant Examiner* — Lawrence H Samuels
(74) *Attorney, Agent, or Firm* — Snell & Wilmer LLP

(57) ABSTRACT

Methods and systems for heating and compressing a material using microwaves. The system includes a flexible waveguide configured to receive a first portion of microwaves and a rigid waveguide configured to receive a second portion of microwaves. The system includes a top microwave antenna connected to the flexible waveguide, having a first plurality of slots for emitting the first portion of microwaves to be received by a top side of the material and heat the material. The system includes a bottom microwave antenna connected to the rigid waveguide, having a second plurality of slots for emitting the second portion of microwaves to be received by a bottom side of the material and heat the material. The system includes a presser configured to provide a downward force onto the top microwave antenna toward the material to compress the material as the material is being heated by the microwaves.

20 Claims, 8 Drawing Sheets

(51) Int. Cl.
*H05B 6/78* (2006.01)
*B29C 43/52* (2006.01)
*H05B 6/72* (2006.01)
*H05B 6/64* (2006.01)
*H05B 6/70* (2006.01)

(52) U.S. Cl.
CPC ............. *H05B 6/708* (2013.01); *H05B 6/72* (2013.01); *H05B 6/80* (2013.01); *B29C 2035/0855* (2013.01); *H05B 2206/046* (2013.01)

(56) References Cited

U.S. PATENT DOCUMENTS

| | | | |
|---|---|---|---|
| 4,512,942 A | 4/1985 | Babbin et al. | |
| 4,938,673 A | 7/1990 | Adrian | |
| 5,228,947 A | 7/1993 | Churchland | |
| 6,358,459 B1 | 3/2002 | Ziegler et al. | |
| 6,743,389 B2 * | 6/2004 | Miyajima | B29C 43/36 264/272.17 |
| 6,984,352 B1 * | 1/2006 | Akopyan | B29C 33/3828 264/219 |
| 7,955,547 B2 | 6/2011 | Plaksunov et al. | |
| 8,487,223 B2 * | 7/2013 | Kimrey, Jr. | F26B 3/347 219/690 |
| 8,936,453 B2 | 1/2015 | Cretti | |
| 9,781,778 B2 | 10/2017 | Heineck et al. | |
| 10,039,157 B2 * | 7/2018 | Stowell | H05B 6/725 |
| 2007/0079522 A1 * | 4/2007 | Kimrey, Jr. | F26B 3/347 34/79 |
| 2007/0079523 A1 * | 4/2007 | Kimrey, Jr. | F26B 3/347 34/79 |
| 2007/0270062 A1 * | 11/2007 | Weber | B29C 65/18 442/65 |
| 2009/0014918 A1 * | 1/2009 | Zheng | B29C 43/361 264/432 |
| 2010/0059510 A1 * | 3/2010 | Ristola | H05B 6/705 219/690 |
| 2011/0073589 A1 * | 3/2011 | Shimizu | H05B 6/806 219/647 |
| 2011/0266717 A1 * | 11/2011 | Nehls | C08J 9/232 264/413 |
| 2013/0087951 A1 * | 4/2013 | Lin | H01L 21/565 264/490 |
| 2013/0285292 A1 * | 10/2013 | Sanderson | H05B 6/6491 264/402 |
| 2014/0008352 A1 * | 1/2014 | Uemura | H05B 6/62 219/601 |
| 2015/0351166 A1 * | 12/2015 | Stowell | H05B 6/80 219/745 |
| 2017/0333258 A1 * | 11/2017 | Trennepohl | A61F 13/2054 |
| 2018/0099431 A1 * | 4/2018 | Gartz | H05B 6/784 |

FOREIGN PATENT DOCUMENTS

| | | |
|---|---|---|
| EP | 0968803 | 1/2000 |
| FR | 2650775 | 8/1989 |
| FR | 2669557 | 11/1990 |

* cited by examiner

MICROWAVE APPLICATOR WITH PRESSURIZER FOR PLANAR MATERIAL HEATING

BACKGROUND

1. Field

This specification relates to a system and a method for fabricating materials using heating and compression.

2. Description of the Related Art

Some materials are fabricated using a combination of heating and compression. Conventional methods of heating the material from the outside using heated surfaces and compressing the material have many shortcomings. In particular, heating the material from the outside inward is a relatively slow process, as it may take a long time for the heat from the heated surfaces to penetrate through the material and heat the entire material.

Conventional methods for relatively fast heating may include using microwaves to heat objects (e.g., carpet, paper, wood, food, etc.). However, conventional methods of heating objects using microwaves have not included a way to compress the object while being heated by the microwaves. Thus, there is a need for systems and methods of heating and compressing materials.

SUMMARY

What is described is a system for simultaneously heating and compressing a material using microwaves. The system includes a flexible waveguide configured to receive a first portion of the microwaves. The system also includes a rigid waveguide configured to receive a second portion of the microwaves. The system also includes a top microwave antenna connected to the flexible waveguide, having a first plurality of slots, and configured to receive the first portion of the microwaves and emit the first portion of the microwaves through the first plurality of slots to be received by a top side of the material and heat the material. The system also includes a bottom microwave antenna connected to the rigid waveguide, having a second plurality of slots, and configured to receive the second portion of the microwaves and emit the second portion of the microwaves through the second plurality of slots to be received by a bottom side of the material and heat the material. The system also includes a presser coupled to the top microwave antenna and configured to provide a downward force onto the top microwave antenna toward the material to compress the material between the top microwave antenna and the bottom microwave antenna as the material is being heated by the microwaves, the flexible waveguide connected to the top microwave antenna being bent as the presser provides the downward force onto the top microwave antenna.

Also described is an apparatus for simultaneously heating and compressing a material using microwaves. The apparatus includes a flexible waveguide configured to receive microwaves. The apparatus also includes a first microwave antenna connected to the flexible waveguide, having a plurality of slots, and configured to receive the microwaves and emit the microwaves through the plurality of slots to be received by a first side of the material and heat the material. The apparatus also includes a presser coupled to the first microwave antenna and configured to provide a force onto the first microwave antenna toward the material to compress the material as the material is being heated by the microwaves, the flexible waveguide connected to the first microwave antenna being bent as the presser provides the force onto the first microwave antenna.

Also described is a method for simultaneously heating and compressing a material using microwaves. The method includes placing the material between a top microwave antenna and a bottom microwave antenna. The method also includes providing a flexible waveguide connected to the top microwave antenna with a first portion of the microwaves. The method also includes providing a rigid waveguide connected to the bottom microwave antenna with a second portion of the microwaves. The method also includes emitting by a first plurality of slots of the top microwave antenna, the first portion of the microwaves onto a top side of the material to heat the material. The method also includes emitting by a second plurality of slots of the bottom microwave antenna, the second portion of the microwaves onto a bottom side of the material to heat the material. The method also includes providing a downward force by a presser coupled to the top microwave antenna onto the top microwave antenna toward the material to compress the material between the top microwave antenna and the bottom microwave antenna as the material is being heated by the microwaves, the flexible waveguide connected to the top microwave antenna being bent as the presser provides the downward force onto the top microwave antenna.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, devices, and methods for simultaneously heating and compressing a material. The simultaneous heating and compressing may be beneficial in the fabrication process of the material. For example, to manufacture a carbon fiber reinforced nylon composite, relatively high pressure is needed to consolidate the materials (carbon fiber and nylon) into a flat, planar form. Conventional systems of heating and compressing the composite material using opposing heated surfaces are inadequate, as the heating of the composite material may be relatively slow, and the core of the composite material may be heated at a much slower rate than the exterior surfaces of the composite material.

Microwaves are capable of heating the composite material evenly and throughout the material (as opposed to heating the material from external surfaces inward), but conventional methods of heating using microwaves do not provide for a way to compress the composite material. A process of alternating between heating using microwaves and compressing using a clamp or vise may be used. However, during the time after removing the composite material from the microwave and before the composite material is compressed in the clamp or vise, the temperature of the composite material may have fallen by a significant amount, and the effectiveness of the compression from the clamp or vise may be reduced. As a result, the process of heating and compressing may be repeated until the composite material is fully fabricated. The pressure provided to the composite material may also loosen when it is returned to the microwave for heating, as the pressure is not maintained while the composite material is being heated. This process may result in significant labor costs and may also result in inconsistently manufactured composite materials.

The systems and methods described herein use microwaves to heat the composite material while simultaneously applying compression to the composite material to efficiently and effectively fabricate the composite material. As used herein, the term "microwave" and "microwaves" refer to the form of electromagnetic radiation, and not necessarily a microwave oven commonly used to heat food.

Figure 1A:
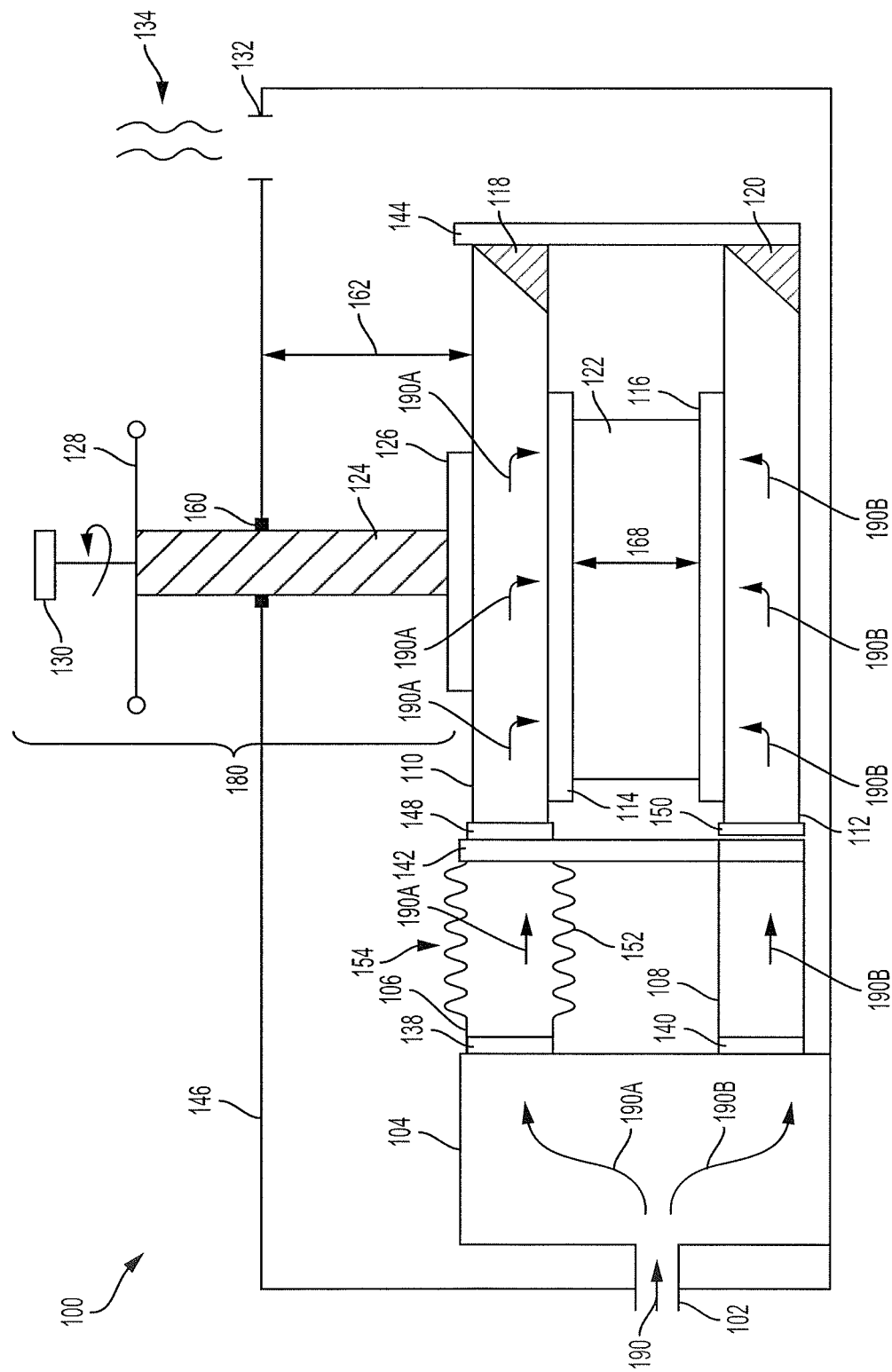
FIGS. 1A-1B illustrate a side cross-sectional view of a system for heating and compressing a material, according to various embodiments of the invention.

FIG. 1A illustrates a side cross-sectional view of the system 100 for heating and compressing a composite material.

The system 100 includes an inlet 102 for receiving microwaves (indicated with arrows 190). The inlet 102 is connected to a waveguide splitter 104 which separates the microwaves 190 into a first portion of microwaves 190A and a second portion of microwaves 190B.

The waveguide splitter 104 is connected to a flexible waveguide 106 and a rigid waveguide 108. The flexible waveguide 106 is located above the rigid waveguide 108. The flexible waveguide 106 is configured to receive the first portion of microwaves 190A from the waveguide splitter 104. The rigid waveguide 108 is configured to receive the second portion of microwaves 190B from the waveguide splitter 104. The flexible waveguide 106 may be coupled to the waveguide splitter 104 via a coupler 138 (e.g., a clamp, connector, or adaptor). The rigid waveguide 108 may be coupled to the waveguide splitter 104 via a coupler 140 (e.g., a clamp, connector, or adaptor). The flexible waveguide 106 may have ridges 152 or other flexible features (e.g., bellows) allowing it to bend in at least a vertical direction.

The flexible waveguide 106 is configured to guide the first portion of microwaves 190A to a top microwave antenna 110. The top microwave antenna 110 includes slots (illustrated in FIG. 3B) that guide and direct the microwaves 190A to the material 122 to be heated and compressed. In particular, the slots guide and direct the microwaves 190A to the material from a first direction (e.g., a top direction) and the microwaves 190A penetrate the material and cause the material to become heated.

Similarly, the rigid waveguide 108 is configured to guide the second portion of microwaves 190B to a bottom microwave antenna 112. The bottom microwave antenna 112 includes slots (illustrated in FIG. 3B) that guide and direct the microwaves 190B to the material 122 to be heated and compressed. In particular, the slots guide and direct the microwaves 190B to the material from a second direction (e.g., a bottom direction) opposite the first direction and the microwaves 190B penetrate the material and cause the material to become heated.

The top microwave antenna 110 may be coupled to the flexible waveguide 106 via a coupler 148 (e.g., a clamp, connector, or adaptor). The bottom microwave antenna 112 may be coupled to the rigid waveguide 108 via a coupler 150 (e.g., a clamp, connector, or adaptor). The top microwave antenna 110 may also include a termination 118 configured to terminate the transmission of the microwaves 190A. Similarly, the bottom microwave antenna 112 may also include a termination 120 configured to terminate the transmission of the microwaves 190A. The termination 118 and the termination 120 may be inserted into the respective microwave antennas or the respective microwave antennas may be manufactured to have the terminations formed integrally in the microwave antennas. The shape of the terminations may vary based on the dimensions of other components of the system 100.

A top barrier 114 may be located between the top microwave antenna 110 and the material 122 to be heated and compressed. The top barrier 114 is configured to prevent the slots of the top microwave antenna 110 from deforming the material 122 and to provide a wide, even surface to contact the material 122 so that the compression force is evenly applied to the material 122. The top barrier 114 may be made of any material that is rigid and that also allows microwaves to pass through the material, such as quartz.

A bottom barrier 116 may be located between the bottom microwave antenna 112 and the material 122 to be heated and compressed. The bottom barrier 116 is configured to prevent the slots of the bottom microwave antenna 112 from deforming the material 122 and to provide a wide, even surface to contact the material 122 so that the compression force is evenly applied to the material 122. The bottom barrier 116 may be made of any material that is rigid and that also allows microwaves to pass through the material, such as quartz.

The waveguide splitter 104, the flexible waveguide 106, the rigid waveguide 108, the top microwave antenna 110, and the bottom microwave antenna 112 are all located within an enclosure 146 configured to contain the microwaves transmitted to the material 122. In some embodiments, the enclosure is a faraday cage. When the material 122 is being heated, fumes 134 may be created, and the fumes 134 may be expelled from the enclosure 146 by a vent 132.

Connected to the enclosure 146 is a presser shaft 124, which may be threaded, such that when the presser shaft 124 is rotated, the presser shaft moves upward or downward relative to the enclosure 146. The presser shaft 124 may be connected to a presser plate 126 within the enclosure 146, and the presser plate 126 may be coupled to the top microwave antenna 110. The presser shaft 124 may be surrounded by a seal 160 connected to an opening of the enclosure 146. The seal 160 may work in conjunction with threads of the presser shaft 124 to move the presser shaft 124 up or down when rotated. The presser shaft 124 may be rotated manually using a handle 128 or automatically using an actuator 130.

As the material 122 is being heated by the microwaves 190, compressive pressure may be simultaneously applied to the material 122 by the presser shaft 124, the presser plate 126, and the handle 128 or the actuator 130. These components may collectively be referred to as the presser 180. In order to prevent lateral movement of elements within the material 122, there may be a first set of aligning pins 142 and a second set of aligning pins 144 to ensure that the top microwave antenna 110 moves straight downward.

The first set of aligning pins 142 may be located proximal to the connection between the flexible waveguide 106 and the top microwave antenna 110 and the connection between the rigid waveguide 108 and the bottom microwave antenna 112. The second set of aligning pins 144 may be located proximal to the end of the top microwave antenna 110 having the termination 118 and the end of the bottom microwave antenna 112 having the termination 120. Put differently, the first set of aligning pins 142 may be located proximal to a first end of the top microwave antenna 110 and the bottom microwave antenna 112 and the second set of aligning pins 144 may be located proximal to a second end of the top microwave antenna 110 and the bottom microwave antenna 112.

As shown in FIG. 1A, the distance from the top surface of the top microwave antenna 110 to the top of the enclosure 146 is a first distance 162. In addition, the thickness of the material 122 is a first thickness 168 and the flexible waveguide 106 has a first state 154 where the flexible waveguide 106 is substantially straight and substantially parallel with the top microwave antenna 110. As the presser shaft 124 is rotated, the distance from the top surface of the top microwave antenna 110 to the top of the enclosure 146 will increase and the thickness of the material 122 will decrease. In addition, the flexible waveguide 106 will bend.

Figure 1B:
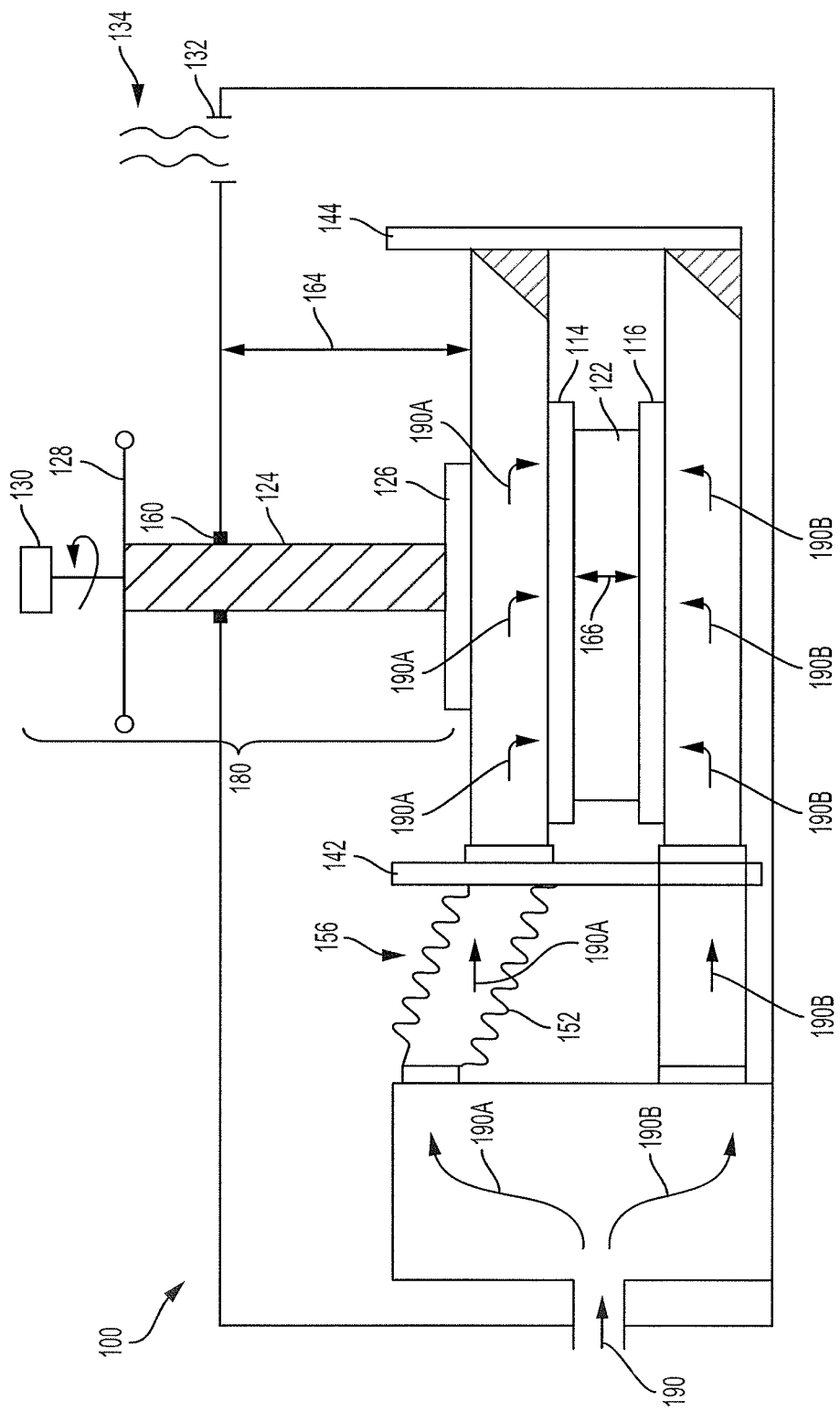

FIG. 1B illustrates the system 100 as the presser shaft 124 is rotated, causing pressure in a vertical direction to be applied to the material 122. The distance from the top surface of the top microwave antenna 110 to the top of the enclosure 146 has increased to a second distance 164, and the thickness of the material 122 has decreased to a second thickness 166. In addition, the flexible waveguide 106 has bent to a second state 156 that is substantially inclined.

The ridges 152 of the flexible waveguide 106 allow for the bending of the flexible waveguide 106. The bending of the flexible waveguide 106 allows for microwaves 190 to remain being provided to the top microwave antenna 110 as pressure is applied to the material 122 via the top microwave antenna 110 and the presser 180.

At all times, the top microwave antenna 110 and the bottom microwave antenna 112 may be substantially parallel with each other. That is, the top microwave antenna 110 may lie along a first plane that is substantially parallel with a material plane established by the material 122, and the bottom microwave antenna 112 may lie along a second plane that is also substantially parallel with the first plane and the material plane.

The top barrier 114 and the bottom barrier 116 may, at all times, be substantially parallel with each other. That is, the barrier 114 may lie along a third plane that is substantially parallel with the material plane established by the material 122, and the bottom barrier 116 may lie along a fourth plane that is also substantially parallel with the third plane and the material plane. The flexible waveguide 106 allows for the maintaining of this substantially parallel arrangement, despite the downward force provided by the presser 180.

Figure 2:
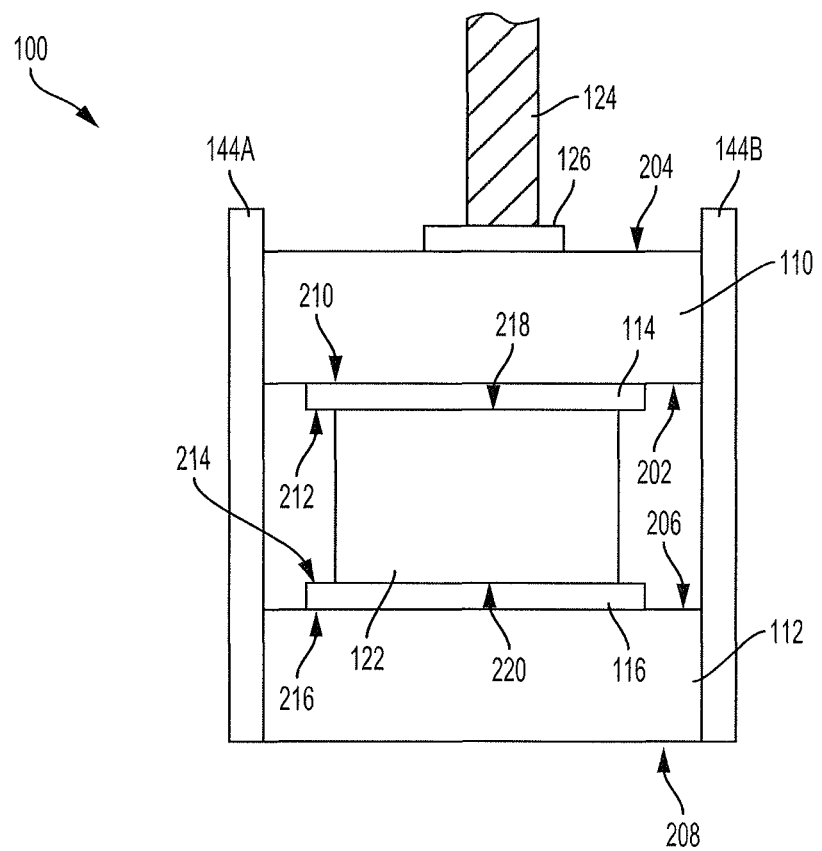
FIG. 2 illustrates an end view of the system for heating and compressing a material, according to various embodiments of the invention.

FIG. 2 illustrates an end view of the system 100 located within the enclosure 146 of FIG. 1A. The end view in FIG. 2 shows the view from the end of the top microwave antenna 110 and the bottom microwave antenna 112 that contain the respective terminations 118 and 120. Accordingly, the aligning pins shown are the second set of aligning pins 144. The second set of aligning pins 144 include a left aligning pin 144A and a right aligning pin 144B. The second set of aligning pins 144 may be connected to each other below the bottom microwave antenna 112 or may be separated, as shown in FIG. 2. The second set of aligning pins 144 are configured to limit the lateral movement of the top microwave antenna 110 and the bottom microwave antenna 112 relative to the material 122, to ensure the compression of the material 122 is in a vertical direction.

The top microwave antenna 110 has a top surface 204 that contacts the presser plate 126, and a bottom surface 202 that contacts a top surface 210 of the top barrier 114. The bottom surface 212 (or a portion thereof) of the top barrier 114 contacts a top surface 218 of the material 122.

Similarly, the bottom microwave antenna 112 has a bottom surface 208 that contacts a floor of the enclosure 146, and a top surface 206 that contacts the bottom surface 216 of the bottom barrier 116. The top surface 214 (or a portion thereof) of the bottom barrier 116 contacts the bottom surface 220 of the material 122.

Again, as the microwaves are emitted from the top microwave antenna 110 and the bottom microwave antenna 112 and into the material 122, the material 122 is heated. At the same time, as the presser shaft 124 is rotated, the presser plate 126 is urged downward toward the material 122. The compressive force from the presser 180 is transmitted through the top microwave antenna 112 and through the top barrier 114 into the material 122.

In an example embodiment, the material 122 may be a combination of carbon fibers and resin fibers. The carbon fibers and the resin fibers may be placed in water and mixed. The fibers then may be stacked and placed in between the top microwave antenna 110 and the bottom microwave antenna 112, as shown in FIG. 1A and FIG. 2. Microwaves may be used to heat the material 122 and the presser 180 may be used to compress the material 122 until the carbon fibers and resin fibers bond together and reduce in height, as shown in FIG. 1B.

The amount of microwaves delivered to the material 122, the rate of microwave transmission, the pressure provided to the material 122, and the rate of pressure increase may all vary based on the composition of elements the material 122 is made of.

While the presser 180 is illustrated as having a presser shaft 124 and a turning mechanism (e.g., a handle 128 or an actuator 130), the presser may be any mechanism to apply pressure, such as a pneumatic compression device, a shaft and a ratcheting crank, or a pump and an inflatable shaft.

Figure 3A:
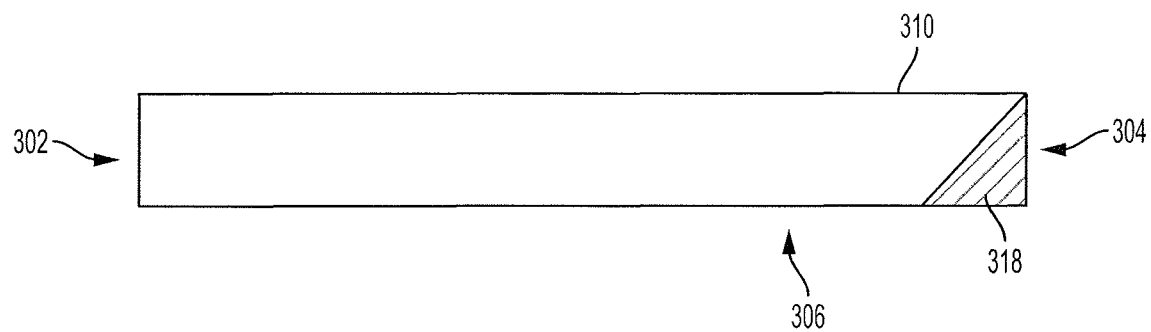
FIGS. 3A-3C illustrate views of a microwave antenna to be used in the system for heating and compressing a material, according to various embodiments of the invention.

FIG. 3A illustrates a microwave antenna 310 similar to the top microwave antenna 110 or bottom microwave antenna 112 of FIGS. 1A and 1B. The microwave antenna 310 has a first end 302 and a second end 304. The first end 302 is coupled to a flexible waveguide (e.g., flexible waveguide 106) or a rigid waveguide (e.g., rigid waveguide 108) and the microwaves are received by the microwave antenna 310 from the first end 302. The second end 304 of the microwave antenna 310 contains the termination 318. The termination 318 prevents the microwaves from bouncing back toward the source of the microwaves. The termination 318 may be an inserted object or may be formed integrally within the microwave antenna 310.

Figure 3B:
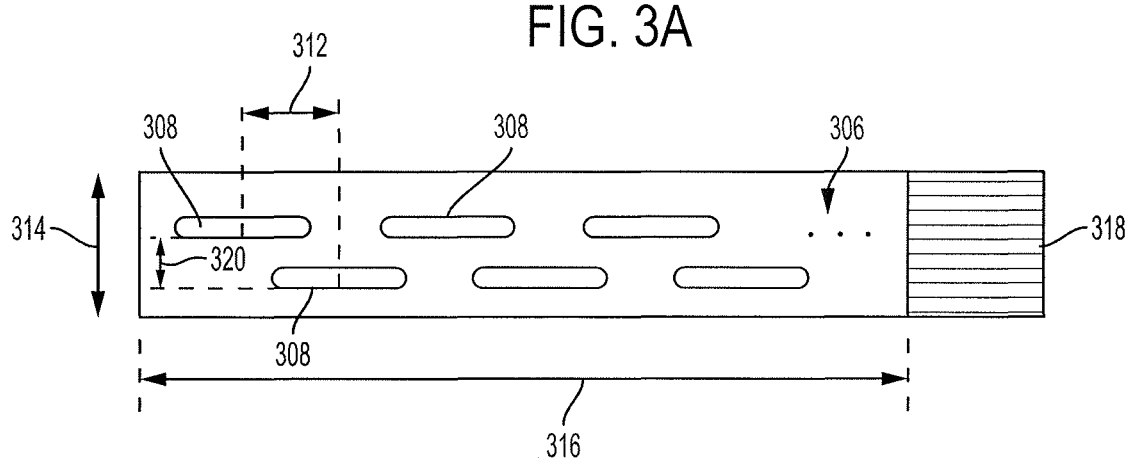

FIG. 3B illustrates a bottom side 306 of the microwave antenna 310. On the bottom side 306 of the microwave antenna 310, there are slots 308. The slots 308 allow the microwaves to reach the material to be heated and compressed. The slots 308 may be separated laterally by a lateral distance 320 and the center points of the slots 308 may be separated longitudinally by a longitudinal distance 312. The lengths and widths of the slots 308 as well as the distance between the slots (e.g., lateral distance 320 and longitudinal distance 312) may vary based on the material to be heated and compressed and the microwave source and transmission rate. The bottom side 306 of the microwave antenna 310 has a length 316 and a width 314.

Figure 3C:
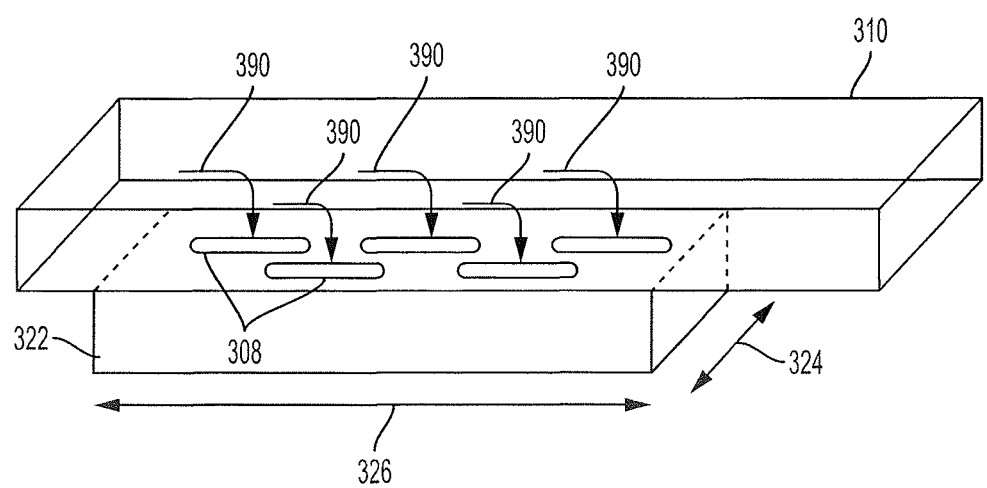

FIG. 3C illustrates the microwave antenna 310 and a material 322 to be heated and compressed. The barrier (e.g., top barrier 114 or bottom barrier 116) is not shown, but may be located between the microwave antenna 310 and the material 322. While the microwave antenna 310 is shown as being a top microwave antenna, the microwave antenna 310 may be rotated 180 degrees along a lengthwise longitudinal axis and used as a bottom microwave antenna.

The material 322 receives the microwaves 390 via the slots 308, as described herein. The material has a length 326 and a width 324. In some embodiments, in order to provide an even distribution of heating, the size of the material 322 to be heated and compressed may correspond to the length 316 and the width 314 of the bottom side 306. For example, the ratio of the length 326 of the material 322 to the length 316 of the microwave antenna 310 may not exceed a predetermined threshold. Correspondingly, the ratio of the width 324 of the material 322 to the width 314 of the microwave antenna 310 may not exceed another predetermined threshold. The maximum ratio of material length to antenna length and the maximum ratio of material width to antenna width may be based on the composition of the material.

When a material having a relatively large width is to be fabricated, a wider microwave antenna 310 may be used. Alternatively, multiple microwave antennas connected by one or more waveguide splitters may be used.

Figure 4A:
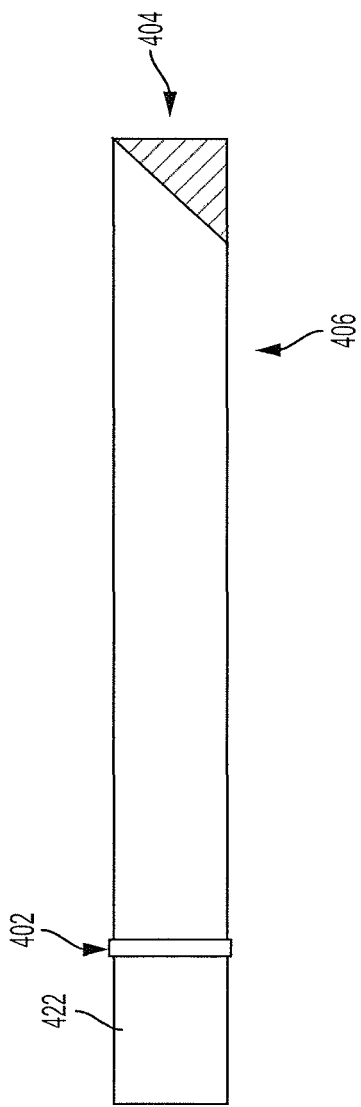
FIGS. 4A-4C illustrate views of multiple microwave antennas connected by a waveguide splitter, to be used in the system for heating and compressing a material, according to various embodiments of the invention.
Figure 4B:
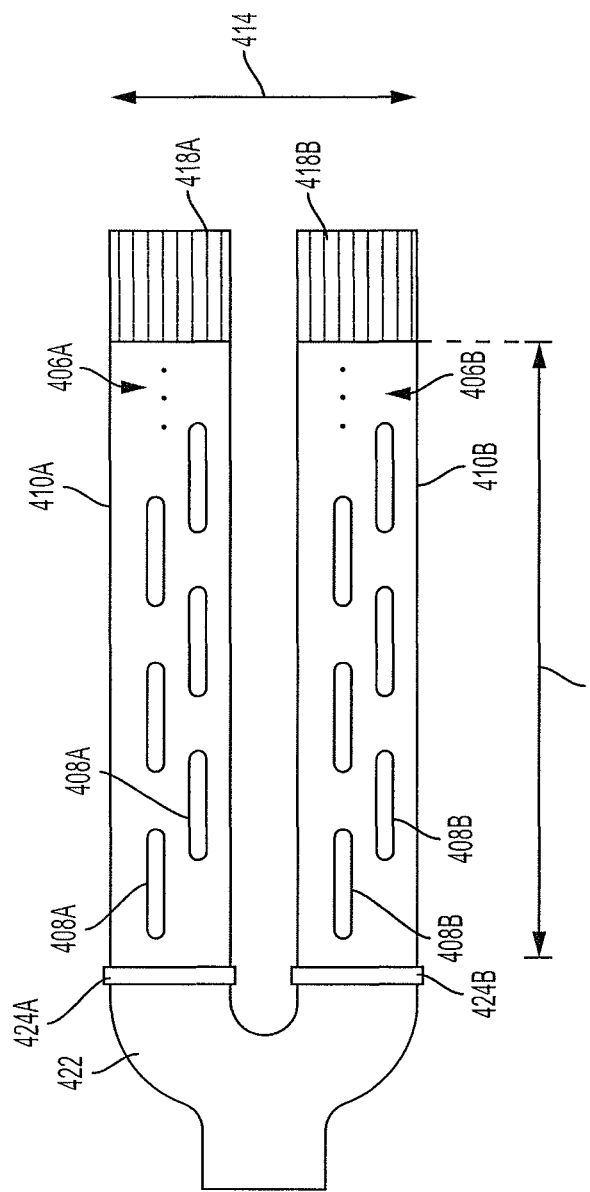
Figure 4C:
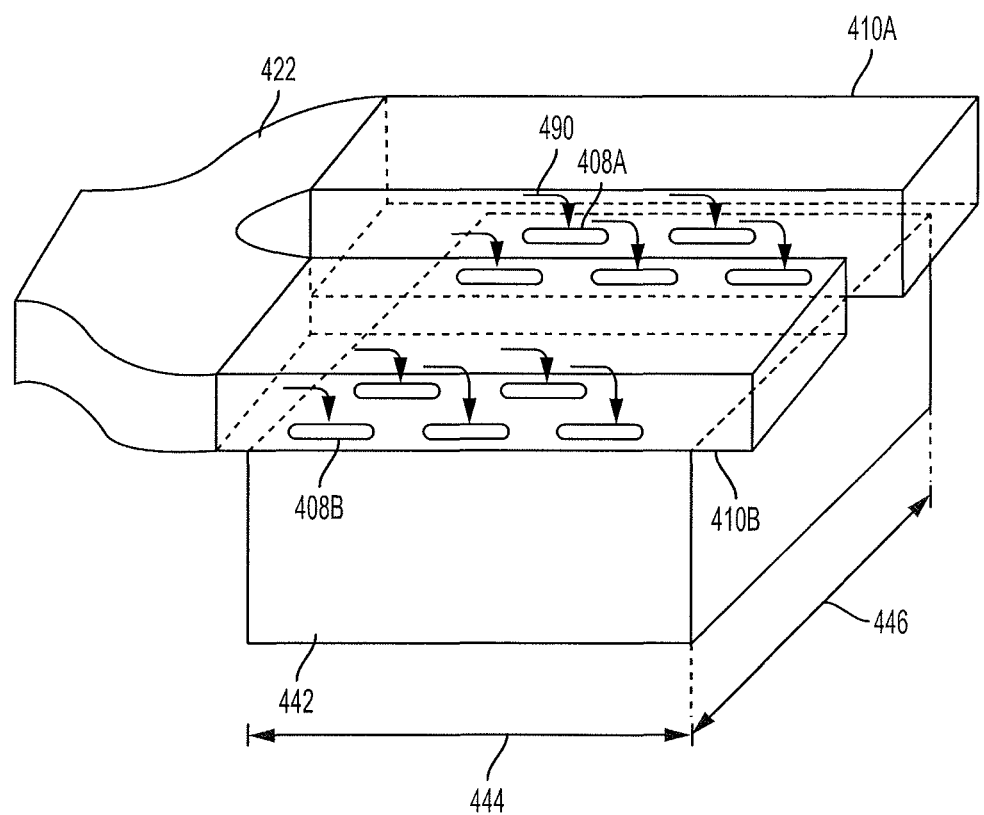

FIGS. 4A-4C illustrate using a waveguide splitter to increase the width of materials that may be manufactured using the systems and methods described herein.

FIG. 4A illustrates a side view of two microwave antennas 410A and 410B and a waveguide splitter 422 connecting the two microwave antennas 410A and 410B. FIG. 4B illustrates a view of the bottom side 406 of the two microwave antennas 410A and 410B and the waveguide splitter 422.

The microwave antennas 410A and 410B have a first end 402 and a second end 404. The first end 402 is coupled to the waveguide splitter 422. In some embodiments, couplers 424A and 424B are used to couple the waveguide splitter 422 to the microwave antennas 410A and 410B, respectively. The waveguide splitter 422 is also coupled to a flexible waveguide (e.g., flexible waveguide 106) or a rigid waveguide (e.g., rigid waveguide 108) and the microwaves are received by the microwave antennas 410A and 410B from the first end 402 via the waveguide splitter 422. The second end 404 of the microwave antennas 410A and 410B contain the terminations 418A and 418B, respectively. The terminations 418A and 418B prevent the microwaves from bouncing back toward the source of the microwaves. The terminations 418A and 418B may be inserted objects or may be formed integrally within the microwave antennas 410A and 410B, respectively.

The microwave antennas 410A and 410B may have a length 416 and a combined width 414. In addition, the microwave antennas 410A and 410B have slots 408A and 408B, respectively. As illustrated in FIG. 4C, the slots 408A and 408B allow the microwaves 490 to reach the material 442 and heat the material 442. The material 442 has a length 444 and a width 446. In some embodiments, in order to provide an even distribution of heating, the size of the material 442 to be heated and compressed may correspond to the length 416 and the width 414 of the bottom side 406. For example, the ratio of the length 444 of the material 442 to the length 416 of the microwave antennas 410A and 410B may not exceed a predetermined threshold. Correspondingly, the ratio of the width 446 of the material 442 to the width 414 of the microwave antennas 410A and 410B may not exceed another predetermined threshold. The maximum ratio of material length to antenna length and the maximum ratio of material width to antenna width may be based on the composition of the material.

The microwave antennas 410A and 410B and the waveguide splitter 422 may be used in the system illustrated in FIGS. 1A and 1B (replacing top microwave antenna 110 and bottom microwave antenna 112) to accommodate for materials having widths wider than the width of a single microwave antenna. While FIGS. 4A-4C illustrate a waveguide splitter 422 connecting two microwave antennas 410A and 410B, one or more waveguide splitters connecting four microwave antennas, eight microwave antennas, or any other number of microwave antennas may be used to accommodate any size material to be heated and compressed. In this way, the systems and methods described herein are more scalable than conventional or alternative systems.

Figure 5:
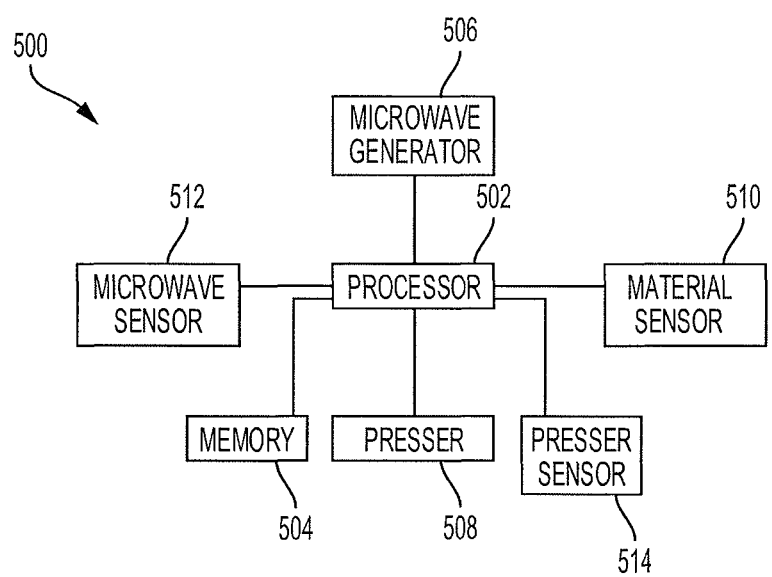
FIG. 5 illustrates a block diagram of the system for heating and compressing a material, according to various embodiments of the invention.

FIG. 5 illustrates a block diagram of components of a system that may be used to heat and compress a material. The system 500 includes a processor 502, a memory 504, a microwave generator 506, a presser 508, a material sensor 510, a microwave sensor 512, and a presser sensor 514.

The processor 502 may be a computer processor such as an ARM processor, DSP processor, distributed processor, microprocessor, controller, or other processing device. The memory 504 may be one or any combination of the following: a RAM or other volatile or nonvolatile memory, a non-transitory memory or a data storage device, such as a hard disk drive, a solid state disk drive, a hybrid disk drive or other appropriate data storage. The memory 504 may further store machine-readable instructions which may be loaded into or stored in the memory 504 and executed by the processor 502.

The microwave generator 506 is configured to generate microwaves to be used to heat the material. The microwave generator 506 may be connected to inlet 102 of FIG. 1A, for example. The presser 508 is configured to provide a compressive force onto a microwave antenna to compress the material as the material is being heated using the microwaves from the microwave generator 506. The presser 508 is similar to the presser 180 of FIG. 1A, and may include a presser shaft, a presser plate, and a turning mechanism (e.g., a handle 128 for manual turning or an actuator 130 for automated turning).

The material sensor 510 may be one or more sensors configured to measure one or more aspects of the material. The material sensor 510 may include a sensor configured to detect a width and/or a length of the material at any given time. The material sensor 510 may include a sensor configured to detect a temperature of the material at any given time. The material sensor 510 may include a sensor configured to detect a moisture level of the material at any given time. The material sensor 510 may include a sensor configured to detect a hardness of the material at any given time.

The microwave sensor 512 may be one or more sensors configured to measure one or more aspects of the microwaves for heating the material. The microwave sensor 512 may include a sensor configured to detect an amount or intensity of microwaves used to heat the material.

The presser sensor 514 may be one or more sensors configured to measure one or more aspects of the presser 508. The presser sensor 514 may include a sensor configured to detect a position of the presser 508 relative to the material and/or the enclosure.

The components of the system 500 may work together to automatically and simultaneously heat and compress the material. For example, after the material is placed between the top microwave antenna 110 and the bottom microwave antenna 112 (and between the top barrier 114 and the bottom barrier 116, respectively), the processor 502 may be provided with material data indicating the composition of the material. Heating and compressing data corresponding to the composition of the material may be stored in memory 504 and retrieved by the processor 502.

The processor 502 may instruct the microwave generator 506 to emit microwaves at a particular intensity and the processor 502 may instruct the presser 508 to provide compressive force at a particular rate. The material sensor 510, the microwave sensor 512, and the presser sensor 514 may provide respective sensor data to the processor 502, and the processor 502 may adjust the operations of the microwave generator 506 and/or the operations of the presser 508 accordingly. For example, if the material was being heated faster than anticipated, the rate of compression of the presser 508 may be increased in order to ensure a consistent compression of the material relative to the temperature of the material.

Figure 6:
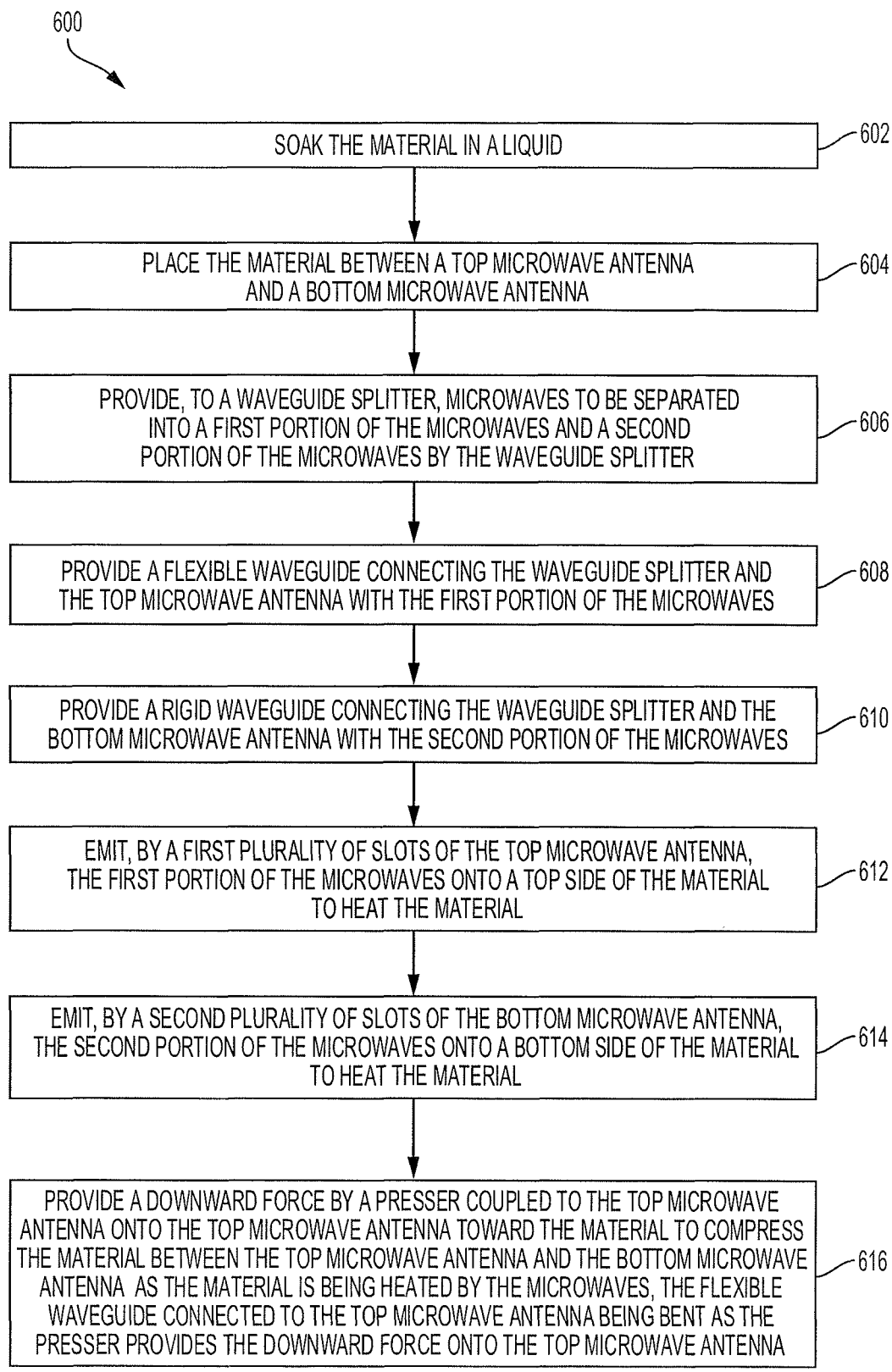
FIG. 6 illustrates a flow diagram of heating and compressing a material, according to various embodiments of the invention.

FIG. 6 illustrates a diagram of a process 600 of heating and compressing a material. The process 600 begins with the material (e.g., material 122) being soaked in liquid (step 602). In some embodiments, the material may not be soaked in liquid if the material itself naturally has moisture. The moisture is agitated by the microwaves, causing the material to be heated.

The material is placed between a top microwave antenna (e.g., top microwave antenna 110) and a bottom microwave antenna (e.g., bottom microwave antenna 112) (step 604). In some embodiments, the top microwave antenna has a top barrier (e.g., top barrier 114) located between the material and the top microwave antenna, and the bottom microwave antenna has a bottom barrier (e.g., bottom barrier 116) located between the material and the bottom microwave antenna.

Microwaves are provided to a waveguide splitter (e.g., waveguide splitter 104) to be separated into a first portion of the microwaves (e.g., first portion 190A) and a second portion of the microwaves (e.g., second portion 190B) (step 606). In some embodiments, the intensity of the microwaves provided to the waveguide splitter are controlled by a computer processing device (e.g., processor 502).

A flexible waveguide (e.g., flexible waveguide 106) is provided with the first portion of the microwaves (step 608). The flexible waveguide may connect the waveguide splitter and the top microwave antenna. The flexible waveguide may be configured to bend or flex in one or more directions, including a vertical direction.

A rigid waveguide (e.g., rigid waveguide 108) is provided with the second portion of the microwaves (step 610). The rigid waveguide may connect the waveguide splitter and the bottom microwave antenna.

A first plurality of slots (e.g., slots 308) of the top microwave antenna may emit the first portion of the microwaves onto a top side of the material to heat the material (step 612). A second plurality of slots (e.g., slots 308) of the bottom microwave antenna may emit the second portion of the microwaves onto a bottom side of the material to heat the material (step 614). In this way, the microwaves cause the material to be relatively evenly heated, as compared to methods of external heating using heated surfaces contacting the exterior surface of the material.

As the material is being heated by receiving the microwaves, a downward force is provided by a presser (e.g., presser 180) (step 616). The presser is coupled to the top microwave antenna and the downward force urges the top microwave antenna toward the material. The flexible waveguide bends as the presser provides the downward force onto the top microwave antenna. The bending or flexing of the flexible waveguide allows the continued transmission of microwaves to the top microwave antenna. Steps 612, 614, and 616 may be performed simultaneously in order to achieve simultaneous compression and heating of the material.

After the material reaches a desired thickness, hardness, or other criteria by which the material is judged, the transmission of microwaves may be halted and the finished fabricated material may be removed from between the top microwave antenna and the bottom microwave antenna.

The components of the systems described herein may be made with any rigid material, such as metal or a metal alloy.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for heating and compressing a material using microwaves, the system comprising:
    a flexible waveguide configured to receive a first portion of the microwaves;
    a rigid waveguide configured to receive a second portion of the microwaves;
    a top microwave antenna connected to the flexible waveguide, having a first plurality of slots, and configured to receive the first portion of the microwaves and emit the first portion of the microwaves through the first plurality of slots to be received by a top side of the material and heat the material;
    a bottom microwave antenna connected to the rigid waveguide, having a second plurality of slots, and configured to receive the second portion of the microwaves and emit the second portion of the microwaves through the second plurality of slots to be received by a bottom side of the material and heat the material; and
    a presser coupled to the top microwave antenna and configured to provide a downward force onto the top microwave antenna toward the material to compress the material between the top microwave antenna and the bottom microwave antenna as the material is being heated by the microwaves, the flexible waveguide connected to the top microwave antenna being bent as the presser provides the downward force onto the top microwave antenna.

2. The system of claim 1, further comprising a waveguide splitter configured to receive the microwaves and split the received microwaves into the first portion of the microwaves and the second portion of the microwaves, the first portion of the microwaves being provided to the flexible waveguide and the second portion of the microwaves being provided to the rigid waveguide.

3. The system of claim 1, further comprising a top barrier located between the material and the top microwave antenna and configured to facilitate even transmission of pressure onto the material; and
a bottom barrier located between the material and the bottom microwave antenna and configured to facilitate even transmission of pressure onto the material.

4. The system of claim 3, wherein the top barrier and the bottom barrier are made of quartz.

5. The system of claim 1, further comprising:
first aligning pins located proximal to a first end of the top microwave antenna and a first end of the bottom microwave antenna; and
second aligning pins located proximal to a second end of the top microwave antenna and a second end of the bottom microwave antenna, the first aligning pins and the second aligning pins configured to maintain alignment of the top microwave antenna and the bottom microwave antenna relative to the material.

6. The system of claim 1, wherein the top microwave antenna and the bottom microwave antenna remain substantially parallel to each other as the presser provides the downward force onto the top microwave antenna toward the material.

7. The system of claim 1, wherein the flexible waveguide has a plurality of ridges to facilitate the flexing of the flexible waveguide.

8. An apparatus for heating and compressing a material using microwaves, the apparatus comprising:
a flexible waveguide configured to receive microwaves;
a first microwave antenna connected to the flexible waveguide, having a plurality of slots, and configured to receive the microwaves and emit the microwaves through the plurality of slots to be received by a first side of the material and heat the material; and
a presser coupled to the first microwave antenna and configured to provide a force onto the first microwave antenna toward the material to compress the material as the material is being heated by the microwaves, the flexible waveguide connected to the first microwave antenna being bent as the presser provides the force onto the first microwave antenna.

9. The apparatus of claim 8, further comprising waveguide splitter configured to receive the microwaves and split the received microwaves into a first portion of the microwaves to be provided to the flexible waveguide, and a second portion of the microwaves.

10. The apparatus of claim 9, further comprising:
a rigid waveguide connected to the waveguide splitter and configured to receive the second portion of the microwaves; and
a second microwave antenna connected to the rigid waveguide, having a second plurality of slots, and configured to receive the second portion of the microwaves and emit the second portion of the microwaves through the second plurality of slots to be received by a second side of the material and heat the material.

11. The apparatus of claim 10, wherein the first microwave antenna and the second microwave antenna remain substantially parallel to each other as the presser provides the force onto the first microwave antenna toward the material.

12. The apparatus of claim 9, further comprising:
a first barrier located between the material and the first microwave antenna and configured to facilitate even transmission of pressure onto the material; and
a second barrier located between the material and the second microwave antenna and configured to facilitate even transmission of pressure onto the material.

13. The apparatus of claim 12, wherein the first barrier and the second barrier are made of quartz.

14. The apparatus of claim 8, further comprising:
first aligning pins located proximal to a first end of the first microwave antenna; and
second aligning pins located proximal to a second end of the first microwave antenna, the first aligning pins and the second aligning pins configured to maintain alignment of the first microwave antenna relative to the material.

15. The apparatus of claim 8, wherein the flexible waveguide has a plurality of ridges to facilitate the flexing of the flexible waveguide.

16. The apparatus of claim 8, further comprising an enclosure configured to house the flexible waveguide and the first microwave antenna, and configured to receive the presser such that at least a portion of the presser is located within the enclosure.

17. A method for heating and compressing a material using microwaves, the method comprising:
placing the material between a top microwave antenna and a bottom microwave antenna;
providing a flexible waveguide connected to the top microwave antenna with a first portion of the microwaves;
providing a rigid waveguide connected to the bottom microwave antenna with a second portion of the microwaves;
emitting by a first plurality of slots of the top microwave antenna, the first portion of the microwaves onto a top side of the material to heat the material;
emitting by a second plurality of slots of the bottom microwave antenna, the second portion of the microwaves onto a bottom side of the material to heat the material; and
providing a downward force by a presser coupled to the top microwave antenna onto the top microwave antenna toward the material to compress the material between the top microwave antenna and the bottom microwave antenna as the material is being heated by the microwaves, the flexible waveguide connected to the top microwave antenna being bent as the presser provides the downward force onto the top microwave antenna.

18. The method of claim 17, wherein the material is soaked in a liquid prior to being placed between the top microwave antenna and the bottom microwave antenna.

19. The method of claim 17, wherein the material is placed between a top barrier connected to the top microwave antenna and a bottom barrier connected to the bottom microwave antenna.

20. The method of claim 17, further comprising
providing, to a waveguide splitter, the microwaves, and splitting, by the waveguide splitter the microwaves into the first portion of the microwaves and the second portion of the microwaves,
wherein the first portion of the microwaves are provided to the flexible waveguide and the second portion of the microwaves are provided to the rigid waveguide.

* * * * *